(12) United States Patent  (10) Patent No.: US 9,402,169 B2
Alameh et al.  (45) Date of Patent: Jul. 26, 2016

(54) METHOD ON A WRITING INSTRUMENT HAVING WIRELESS COMMUNICATION CAPABILITY

(71) Applicant: Motorola Mobility LLC, Chicago, IL (US)

(72) Inventors: Rachid M Alameh, Crystal Lake, IL (US); Iqbal Arshad, South Barrington, IL (US); William S Hede, Lake in the Hills, IL (US); Hisashi D Watanabe, Lake Forest, IL (US)

(73) Assignee: Google Technology Holdings, LLC, Mountain View, CA (US)

( * ) Notice: Subject to any disclaimer, the term of this patent is extended or adjusted under 35 U.S.C. 154(b) by 60 days.

(21) Appl. No.: 14/293,334

(22) Filed: Jun. 2, 2014

(65) Prior Publication Data

US 2015/0271651 A1 Sep. 24, 2015

Related U.S. Application Data

(60) Provisional application No. 61/968,118, filed on Mar. 20, 2014.

(51) Int. Cl.
*H04W 4/12* (2009.01)
*G10L 15/26* (2006.01)

(52) U.S. Cl.
CPC . *H04W 4/12* (2013.01); *G10L 15/26* (2013.01)

(58) Field of Classification Search
CPC .......... G10L 15/26; H04W 4/12; H04W 4/18; H04W 4/00; H04W 88/023; H04W 4/206; H04W 88/00; H04W 88/02; H04W 4/008; H04M 3/00; H04M 2215/8137; H04M 15/844; H04M 7/0048; H04M 3/53341; H04M 1/72547; H04M 3/42382; H04M 3/5307; H04M 1/7253; G06F 2/01; G06F 3/03545; G06F 3/04883
See application file for complete search history.

(56) References Cited

U.S. PATENT DOCUMENTS

| | | | |
|---|---|---|---|
| 6,442,250 B1 * | 8/2002 | Troen-Krasnow | H04L 12/1895 379/93.15 |
| 8,446,298 B2 | 5/2013 | Marggraff et al. | |
| 2003/0224832 A1 * | 12/2003 | King | G06F 1/1616 455/566 |
| 2005/0024346 A1 * | 2/2005 | Dupraz | G06F 3/03545 345/179 |
| 2009/0000832 A1 * | 1/2009 | Marggraff | G06F 3/03545 178/19.01 |
| 2009/0021495 A1 * | 1/2009 | Edgecomb | G06F 3/0317 345/179 |
| 2009/0273586 A1 * | 11/2009 | De Haan | G06F 3/03545 345/179 |
| 2010/0109918 A1 * | 5/2010 | Liebermann | G10L 15/26 341/21 |
| 2013/0196696 A1 * | 8/2013 | Brittain | H04M 3/42102 455/466 |
| 2013/0275133 A1 * | 10/2013 | Wang | G10L 15/265 704/235 |

OTHER PUBLICATIONS

Joanna Stern, Livescribe Pulse Smartpen Review, Published on Aug. 28, 2008, http://www.laptopmag.com/review/accessories/livescribe-pulse-smartpen.aspx.

* cited by examiner

*Primary Examiner* — Meless Zewdu
(74) *Attorney, Agent, or Firm* — Shumaker & Sieffert, P.A.

(57) ABSTRACT

A writing instrument (e.g., a pen or stylus) is able to wirelessly receive a message, receive a responsive input from a user (either spoken or written using the writing instrument), convert the user input into text, and transmit the text in a first mode (if the responsive input is spoken) or in a second mode (if the responsive input is written). The first mode and the second modes may correspond, for example, to different recipient groups.

10 Claims, 7 Drawing Sheets

METHOD ON A WRITING INSTRUMENT HAVING WIRELESS COMMUNICATION CAPABILITY

CROSS-REFERENCE TO RELATED APPLICATIONS

The present application claims priority to U.S. Provisional Patent Application No. 61/968,118, filed Mar. 20, 2014, the contents of which are incorporated herein by reference.

TECHNICAL FIELD

The present disclosure is related generally to wireless communication and, more particularly, to writing instruments having wireless communication capability.

BACKGROUND

With profit margins on traditional consumer electronic devices becoming slimmer due to increased competition, wireless device manufacturers are looking for alternative platforms on which to employ their technology. This, along with the increasing availability of WiFi networks and the decreasing cost of WiFi chips, has led to a proliferation of so-called smart devices—e.g., smartphones, smart watches, smart glasses, and smart appliances—which are able to engage in wireless communication with computers or other devices.

Many smart devices have voice recognition capability, allowing them to respond to voice commands. Many of these devices also have speech-to-text capability, allowing users to compose messages (e.g., text messages and emails) by voice and transmit the messages through traditional wireless communication media using such devices. However, because smart devices are often small and may lack a traditional keyboard or keypad input, a user may not be able to set traditional messaging options, such as being able to specify whether to compose a simple "reply" or a "reply to all" response to an incoming message.

DRAWINGS

While the appended claims set forth the features of the present techniques with particularity, these techniques, together with their objects and advantages, may be best understood from the following detailed description taken in conjunction with the accompanying drawings of which:

DESCRIPTION

According to an embodiment of the disclosure, a writing instrument (e.g., a pen or stylus) is able to wirelessly receive a message, receive a responsive input from a user (either spoken or written using the writing instrument), convert the user input into text, and transmit the text in a first mode (if the responsive input is spoken) or in a second mode (if the responsive input is written). The first mode and the second modes may correspond, for example, to different recipient groups.

In another embodiment, the writing instrument has multiple color sources (e.g., colored ink cartridges, colored pencil tips, electronic ink) from which a user can select. The user writes the message in the selected color. The writing instrument transmits the message in a mode that corresponds to the selected ink color. Each color can, for example, correspond to a different recipient or group of recipients, including different publishing media.

Figure 1A:
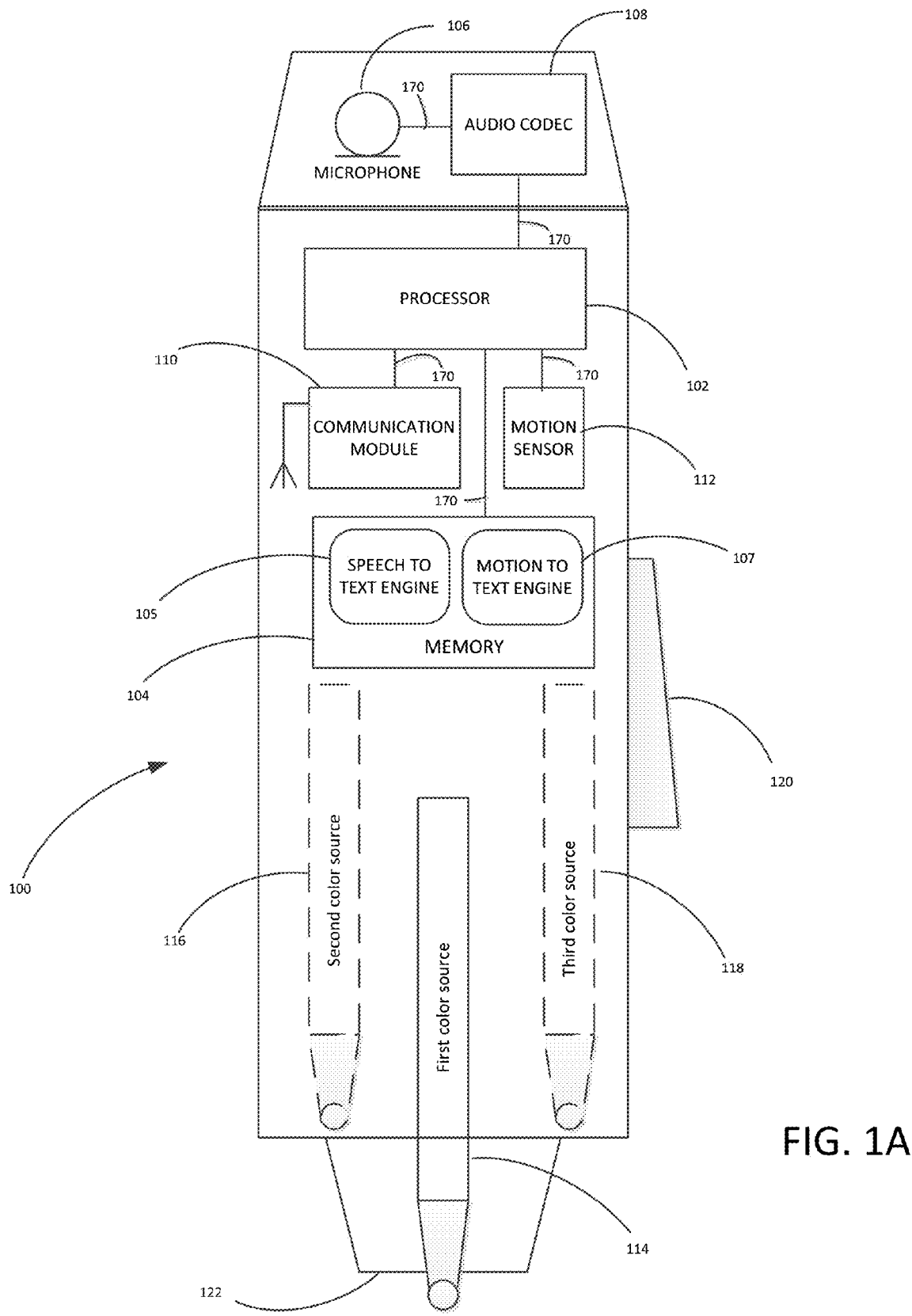
FIG. 1A is a diagrammatic view of a writing instrument according to an embodiment.

Referring to FIG. 1A, an embodiment of a writing instrument 100 includes a processor 102 and a memory 104. The processor 102 executes instructions and uses data stored in the memory 104 in order to carry out the methods described herein. The writing instrument 100 further includes a directional microphone 106 and an audio codec 108. The microphone 106 detects sound, converts the sound into electrical signals, and transmits those electrical signals to the audio codec 108. The audio codec 108 (which may be a microchip) decodes the electrical signals, converts them into digital signals that the processor 102 is able to interpret, and provides the digital signals to the processor 102. The processor 102 executes a speech-to-text engine 105 to convert the digital signals into text (i.e., a digital representation of the text). The writing instrument 100 further includes a motion sensor 112 (e.g., an accelerometer), which senses the motion of the writing instrument 100, generates electrical signals representing the motion, and provides those signals to the processor 102. The processor 102 executes a motion-to-text engine 107 to convert the signals from the motion sensor 112 into text (digital text).

The elements of FIG. 1A are communicatively linked to one another via one or more data pathways 170. Possible implementations of the data pathways 170 include wires and conductive pathways on a microchip. Possible implementations of the processor 102 include a microprocessor and a controller. In some embodiments, the communication module 110 is a wireless chip or chipset, such as Bluetooth® chip (including Low Energy Bluetooth®), WiFi chip, or a cellular baseband chipset. Possible implementations of the writing instrument 100 include a pen (as shown in FIG. 1A) and a stylus (which is shown in FIG. 1B).

Continuing with FIG. 1A, the writing instrument 100 further includes a color source 114. Possible implementations of the color source 114 include physical colors sources, such as an ink cartridge and a colored pencil lead. In some embodiments, the color source 114 is one of multiple color sources of the writing instrument 100. Each of the color sources has a different color. In the drawing of FIG. 1A, the first color source 114 has material (ink or pencil lead) that is of a first color, the second color source 116 has ink that is of second color, while the third color source 118 has ink that is of a third color. A user may select a color source by pressing down on button 120. When the button 120 is pressed, a mechanical arrangement in the writing instrument 100 extends the correct color source through a lower opening 122 of the writing instrument 100. Through the use of sensors or other feedback mechanisms, the processor 102 is informed of which color the user has selected and can transmit a response to a received wireless message in a mode that is based on which color the user selects.

In some embodiments, the writing instrument 100 has multiple tips (selectable using the button), each of which is of a different size or shape, though not necessarily of a different color.

Figure 1B:
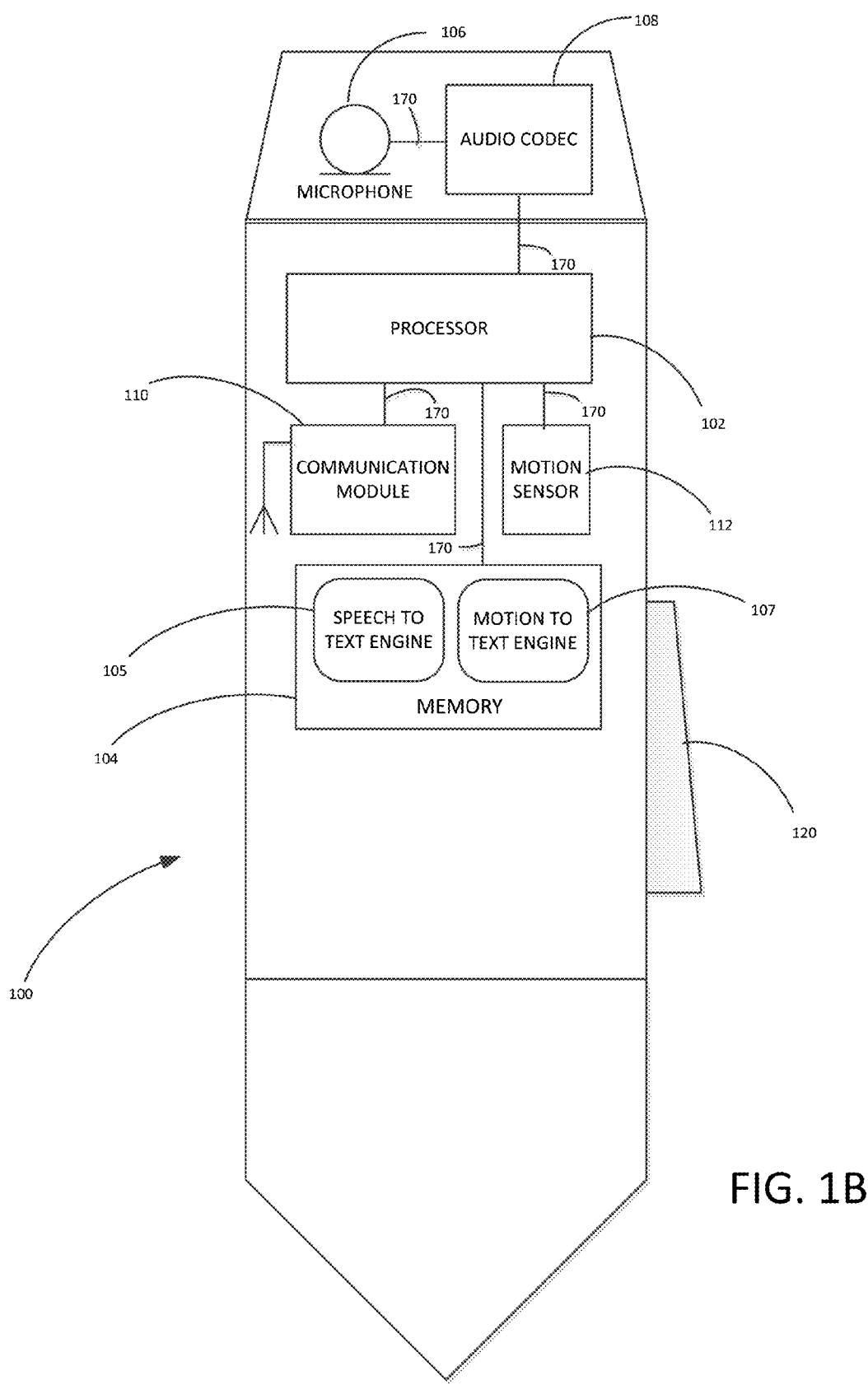
FIG. 1B is a diagrammatic view of a writing instrument according to an alternative embodiment.

In an alternative embodiment, shown in FIG. 1B, the writing instrument 100 is a stylus. In this embodiment, the "color source" is not a physical source, but a virtual one. In other words the writing instrument transmits, along with text, signals indicating the color in which the text is to be rendered (e.g., on a display screen of a nearby computing device). Except for the absence of a physical color source, however, the writing instrument embodiment of FIG. 1B has all of the same components and functionality as the writing instrument embodiment of FIG. 1A.

In an embodiment, the writing instrument 100 sends and receives messages to and from one or more publishing media. As used herein "publishing media" refers to an entity that is capable of publishing (e.g., to other users of a medium) text messages. Examples of publishing media include a website, email, and social media such as Facebook®, Twitter®, LinkedIn®, and Tumbler®. In some embodiments, the writing instrument 100 sends and receives messages directly to or from a public network (e.g., the Internet). In other embodiments, the writing instrument 100 operates in conjunction with a computing device, such as the computing device 200 depicted in FIG. 2.

Figure 2:
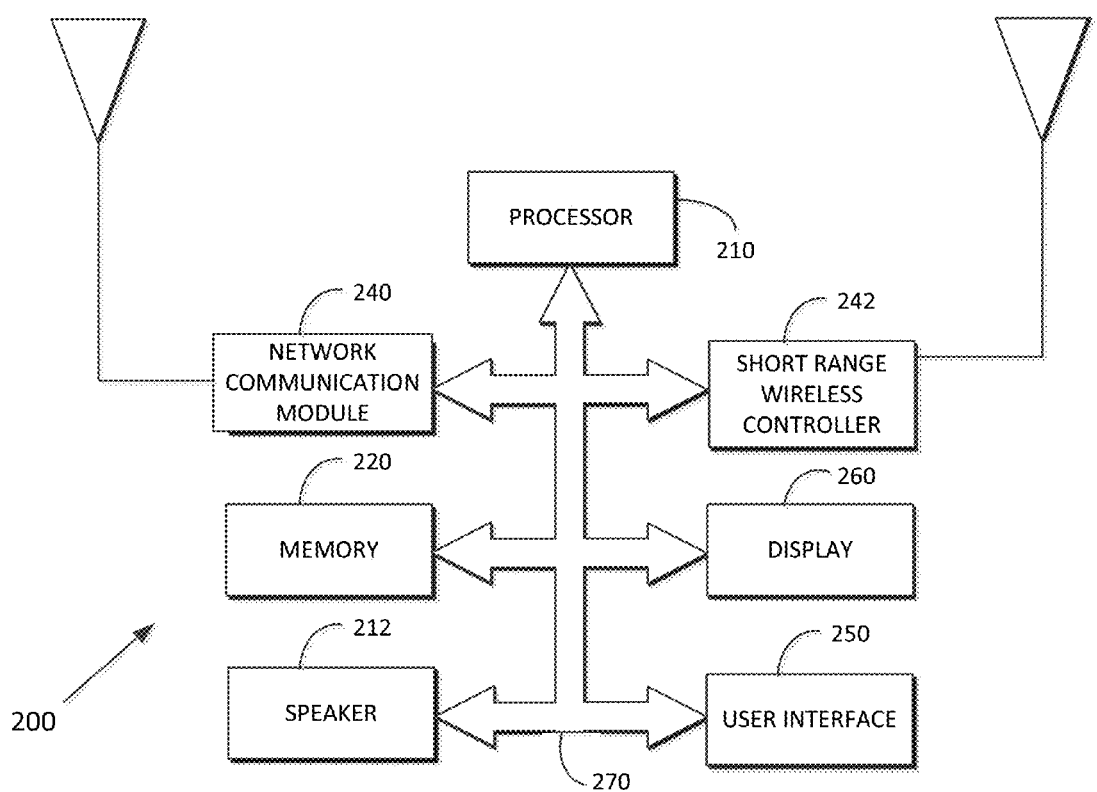
FIG. 2 is a block diagram of a computing device according to an embodiment.

Turning to FIG. 2, a computing device 200 according to an embodiment includes a processor 210, a memory 220 (which can be implemented as volatile memory or non-volatile memory), a network communication module 240 (e.g., WiFI chip or a baseband chipset), a short range wireless controller 242 (e.g., a Bluetooth® controller, such as a BLE controller, an NFC controller, or a wireless infrared controller), a display 260, a speaker 212, and a user interface 250. Each of these elements is communicatively linked to one another via one or more data pathways 270. Possible implementations of the data pathways 270 include wires and conductive pathways on a microchip. Possible implementations of the processor 210 include a microprocessor and a controller. Possible implementations of the computing device 200 include a smartphone and a tablet computer.

The processor 210 retrieves instructions and data from the memory 220 and, using the instructions and data, provides outgoing data to, or receives incoming data from the network communication module 240 and the short-range wireless controller 242.

According to an embodiment, when the writing instrument 100 transmits a message in response to a message previously received (directly from a public network or via the computing device 200, which is connected to the public network) it does so in a mode that is based on how the response message was input into the writing instrument 100. For example, if a user speaks the response into the writing instrument 100 (via the microphone 106), the writing instrument 100 may transmit the text response in a first mode—e.g., transmitting as a "reply all," transmitting to a first publishing medium (such as Facebook®), and transmitting to a first group of recipients (such as "work colleagues"). If the user writes the response with the writing instrument, the writing instrument may transmit the text response in a second mode—e.g., transmitting the reply only to the sender, transmitting to a second publishing medium (such as Twitter®), and transmitting to a different, second group of recipients (such as "family"). Naturally, the examples given above may be reversed in some embodiments, so that the first mode responses are performed with a speech input and the second mode responses are performed with a written input.

A method that may be carried out in an embodiment will now be described with reference to the flowchart of FIG. 3. At block 302, the writing instrument 100 wirelessly receives a message, either directly from a public network, via WiFi from a local network, or via short-range communication from the computing device 200. At block 304, the writing instrument 100 receives an input of a response to the message. If, at block 306, the response is a speech input (via the microphone 106 and the audio codec 108), the processor 102 executes the speech-to-text engine 105 to convert the speech to text at block 308. The processor 102 then wirelessly transmits the text in a first mode at block 310. Possible implementation of wirelessly transmitting text in the first mode include: transmitting the text to a predetermined group of recipients, transmitting the text as a "reply all," and transmitting the text to a first publishing medium.

In an alternative embodiment, the processor 102 transmits the text of the response to the computing device 200 via short-range wireless communication (via the communication module 110) indicating to the computing device 200 the nature of the first mode, and the computing device 200 transmits the text of the response in the first mode.

If, at block 306, the response is a written character input (using the color source 114 and detected by the motion sensor 112), the processor 102 executes the motion-to-text engine 107 to convert the motion to text at block 312. The processor 102 then wirelessly transmits the text in a second mode at block 314. Possible implementation of wirelessly transmitting text in the second mode include: transmitting the text to a group of recipients that is different from the predetermined group of the first mode, transmitting the text solely to the sender, and transmitting the text to a second publishing medium.

Figure 3:
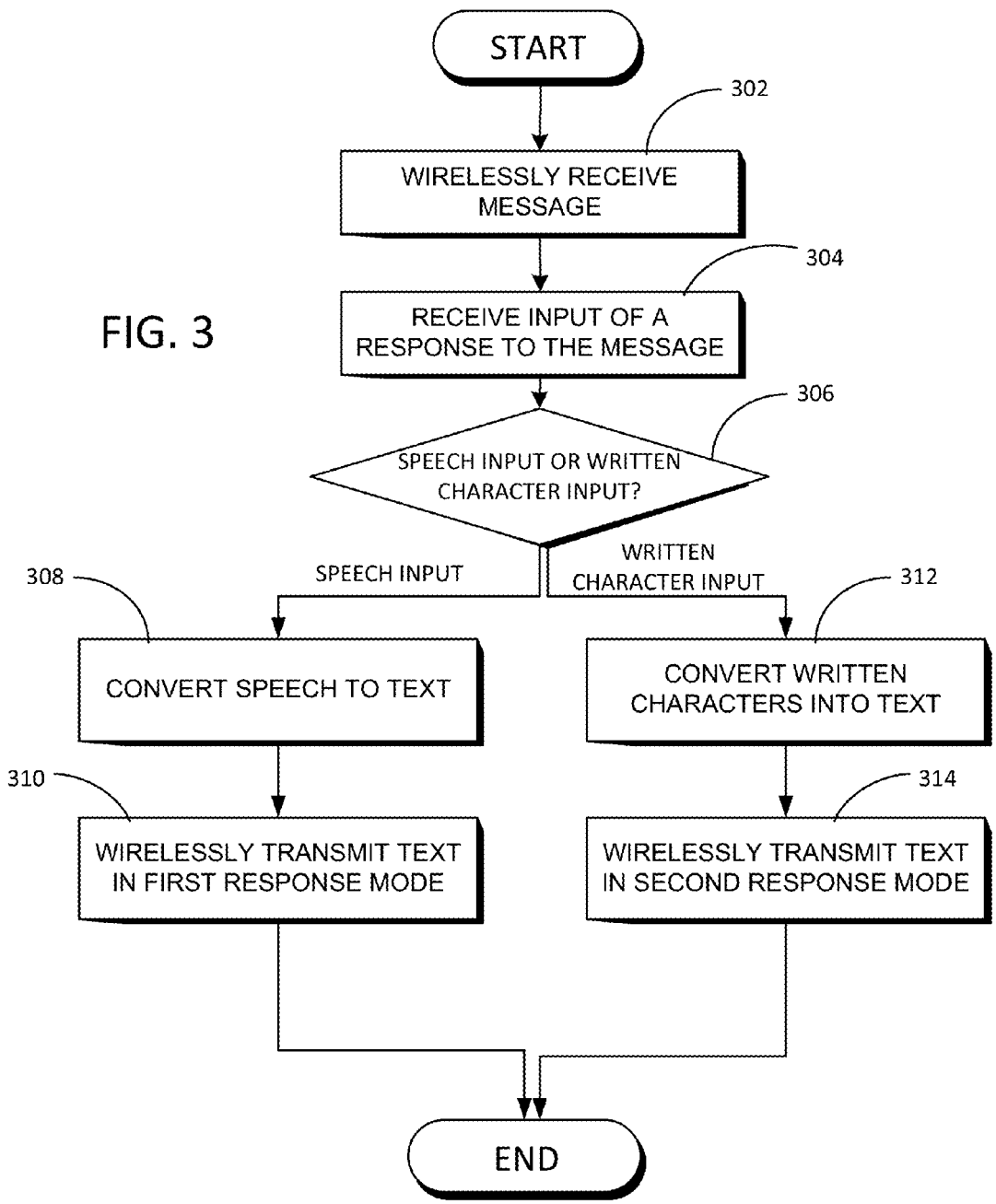
FIG. 3 is a flow diagram of a method that may be carried out in an embodiment.
Figure 4:
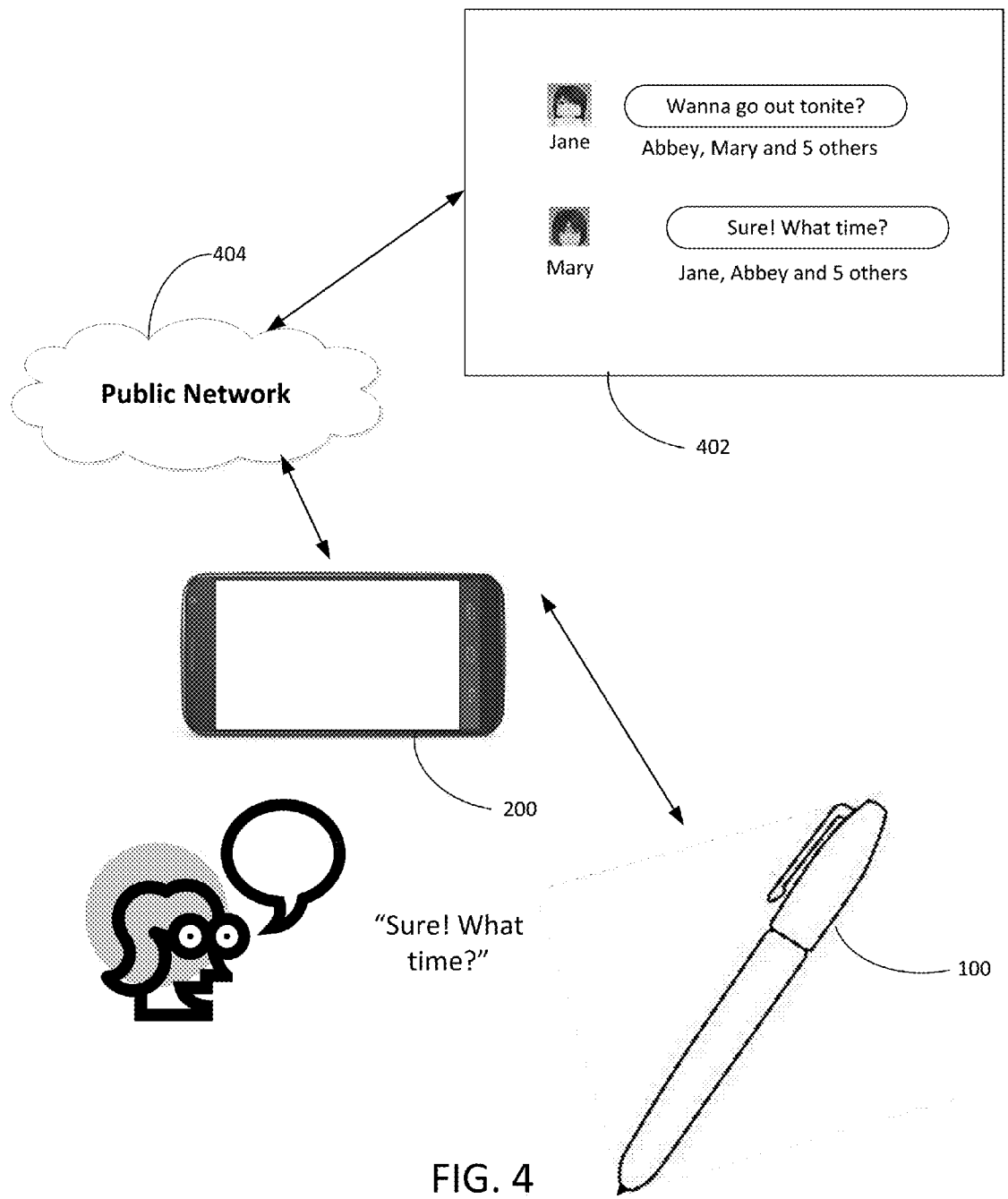
FIGS. 4 and 5 are conceptual diagrams that depict a use case according to an embodiment.

FIG. 4 shows an example scenario for the procedure carried out according to FIG. 3. In this example, the user, Mary, receives a message from Jane via a social media outlet 402, a public network 404, and the computing device 200. The message may show up on the computing device 200, or may be evident on the writing instrument 100 (e.g., a synthetic voice speaking the message out of a speaker of the writing instrument 100 or on a small display on the writing instrument 100). The message is from Jane, and says "Wanna go out tonite?" Mary gives a voice response of "Sure! What time?" The processor 102 of the writing instrument 100 executes the speech-to-text engine 105 and converts Mary's speech into the digital text "Sure! What time?" Because the response is given in spoken form, the processor 102 sends the message as a "reply all."

Figure 5:
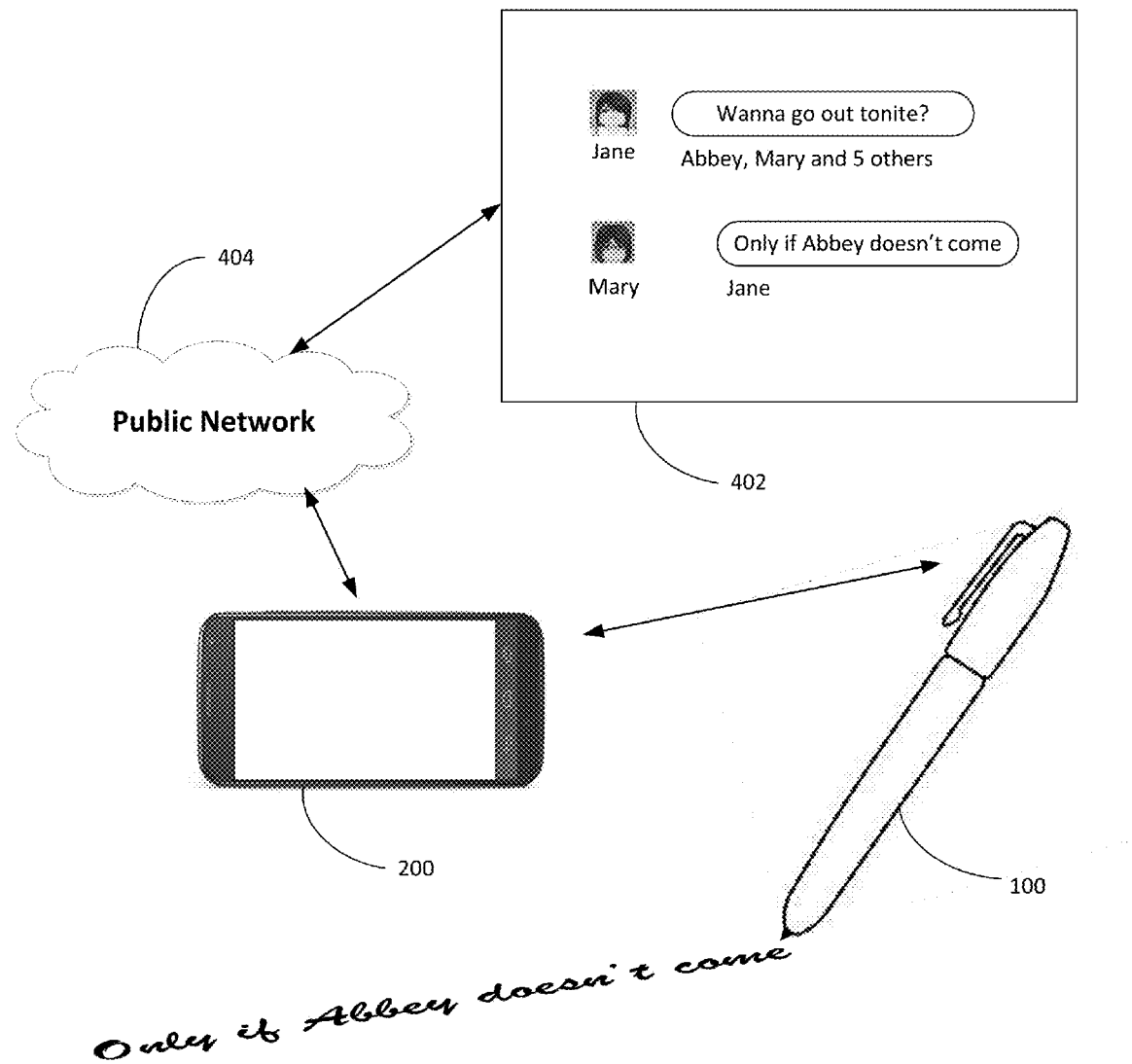

FIG. 5 shows another example scenario for the procedure carried out according to FIG. 3. In this example, Mary does not speak the response, but writes it: "Only if Abbey doesn't come." The processor 102 of the writing instrument 100 detects motion signals from the motion sensor 112 and executes the motion-to-text engine 107 to convert the written characters into text. Because the response is given in the form of written characters, the processor 102 sends the message only to Jane.

Figure 6:
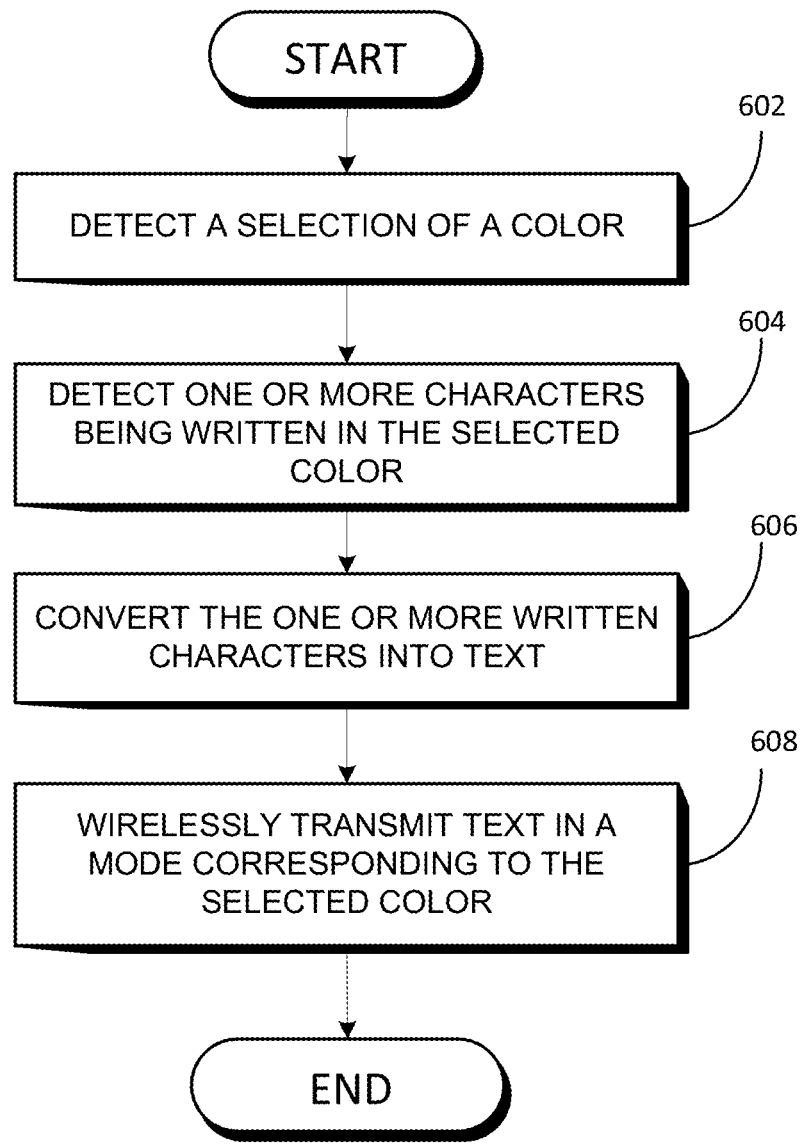
FIG. 6 is a flow diagram of a method that may be carried out in an embodiment.

A method that may be carried out in an embodiment will now be described with reference to the flowchart of FIG. 6. At block 602, the processor 102 detects a user selection of an ink color (e.g., the first color of color source 114, the second color of color source 116, or the third color of color source 118). At block 604, the processor 102 of the writing instrument 100 detects, via the motion sensor 112, one or more characters being written by the writing instrument 100 in the selected color. At block 606, the processor 102 executes the motion-to-text engine 107 to convert the written characters into text. At block 608, the writing instrument 100 wirelessly transmits the text in a mode corresponding to the selected color. For example, if red has been selected, and red corresponds to Twitter®, then the writing instrument 100 transmits the text to Twitter®. If black has been selected, and black corresponds to Facebook®, then the writing instrument 100 transmits the text to Facebook®.

As previously mentioned, the writing instrument 100 may have multiple tips, each with its own size or shape, but not necessarily with its own color. In such case, each size or shape could be associated with a different text mode in the manner described in conjunction with FIG. 6.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the have been described with reference to the figures, it will be understood by those of ordinary skill in the art that various changes in form and details may be made therein without departing from their spirit and scope of as defined by the following claims. For example, the steps of the flowcharts of FIGS. 3 and 6 can be reordered in way that will be apparent to those of skill in the art.

What is claimed is:

1. A method comprising:
receiving, by a wireless network controller of a writing instrument, a message;
receiving, by the writing instrument, an input of a response to the message, wherein the input includes speech or motion data generated by a motion sensor of the writing instrument, the motion data being indicative of characters written using the writing instrument;
determining, by the writing instrument and based on the input, one or more of recipients of a response message, wherein the one or more recipients includes a first set of recipients when the input includes speech and a second set of recipients when the input includes motion data, the first set of recipients being different from the second set of recipients;
responsive to determining that the input is speech, converting, by the writing instrument, the speech to text;
responsive to determining that the input is the motion data, converting, by a motion-to-text engine executing on a processor of the writing instrument, the characters into text;
generating, by the writing instrument and based on the text, the response message; and
transmitting, by the wireless network controller, the response message to the one or more recipients.

2. The method of claim 1, wherein:
the first set of recipients includes multiple recipients; and
the second set of recipients includes only a sender of the message.

3. The method of claim 1, wherein:
the first set of recipients includes only a sender of the message; and
the second set of recipients includes multiple recipients.

4. The method of claim 1, wherein:
the first set of recipients includes a first predetermined group of recipients; and
the second set of recipients includes a second predetermined group of recipients.

5. A method comprising:
receiving, by a wireless network controller of a writing instrument, a message;
receiving, by the writing instrument, a user input for selecting an ink color from a plurality of ink colors of the writing instrument;
while the ink color is selected, generating, by a motion sensor of the writing instrument, motion data indicative of movement of the writing instrument while one or more characters are being written via the movement of the writing instrument;
determining, by the writing instrument and based on the ink color, one or more recipients;
converting, by a motion-to-text engine executed by a processor of the writing instrument, the one or more characters into text; and
transmitting, by the wireless network controller of the writing instrument, the text to the one or more recipients as a response to the message received by the wireless network controller.

6. The method of claim 5, wherein the one or more recipients include only a sender of the message.

7. The method of claim 5, wherein the message is sent to a plurality of recipients, and where the one or more recipients include all other recipients from the plurality of recipients of the message.

8. A writing instrument comprising:
a microphone;
a motion sensor configured to detect movement of the writing instrument;
a wireless communication module configured to transmit and receive messages; and
a processor configured to:
receive, via the wireless communication module, a message;
receive, via one of the microphone or the motion sensor, an input of a response to the message;
determine, based on the input, one more recipients of a response message, wherein the one or more recipients includes a first set of recipients when the input includes speech detected by the microphone and a second set of recipients when the input includes motion data generated by the motion sensor, the first set of recipients being different from the second set of recipients;
if the input includes the speech detected by the microphone, convert the speech into text;
if the input includes the motion data generated by the motion sensor, generate, based on the motion data, the text;
generate, based on the text, the response message; and
transmit, via the wireless communication module, the response message to the one more recipients.

9. The writing instrument of claim 8, wherein:
the first set of recipients includes a predefined group of recipients; and
the second set of recipients includes a single sender of the message.

10. The writing instrument of claim 8, wherein:
the first set of recipients includes a single sender of the message;
the second set of recipients includes a predefined group of recipients.

\* \* \* \* \*